United States Patent Office 3,159,189
Patented Dec. 1, 1964

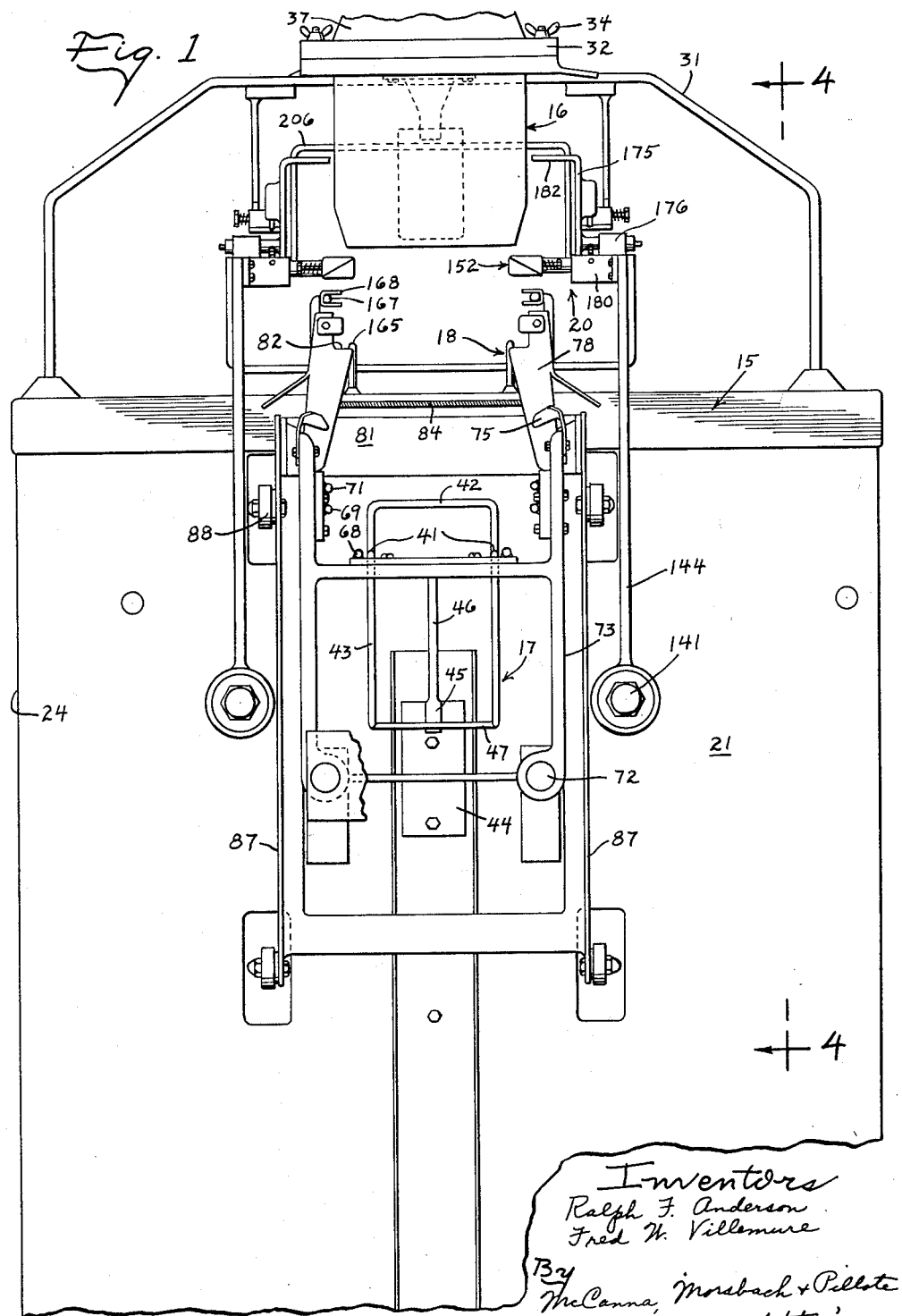

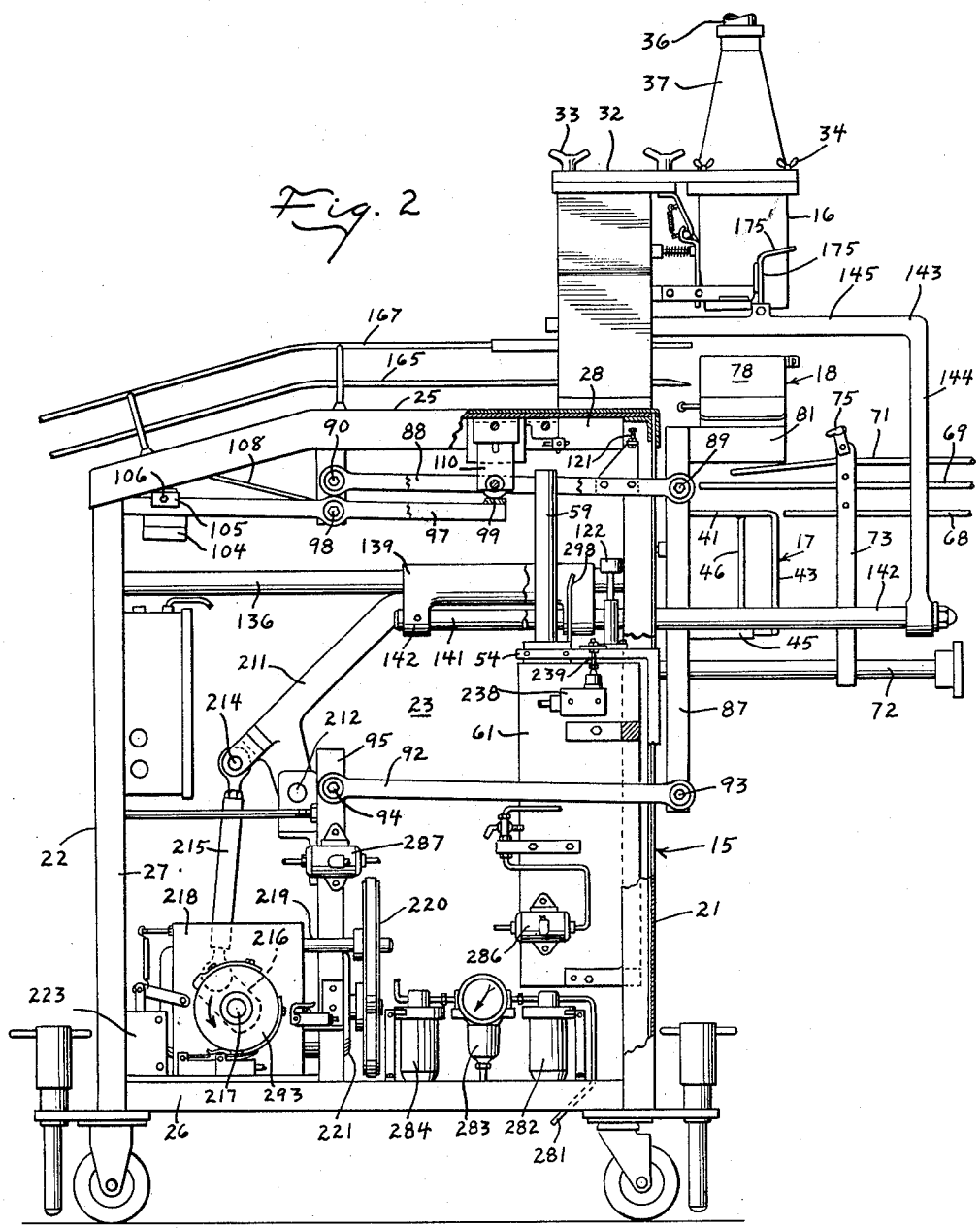

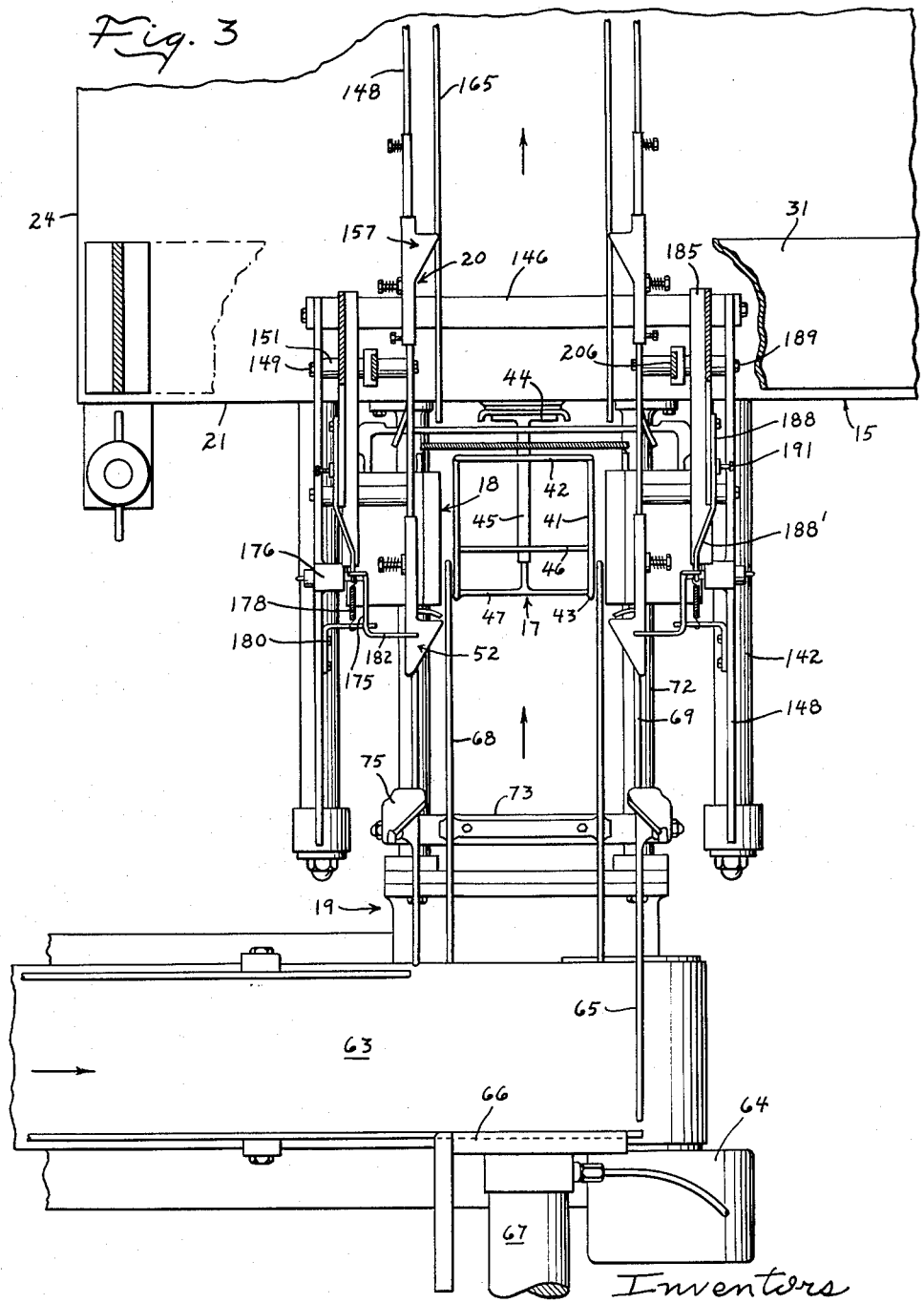

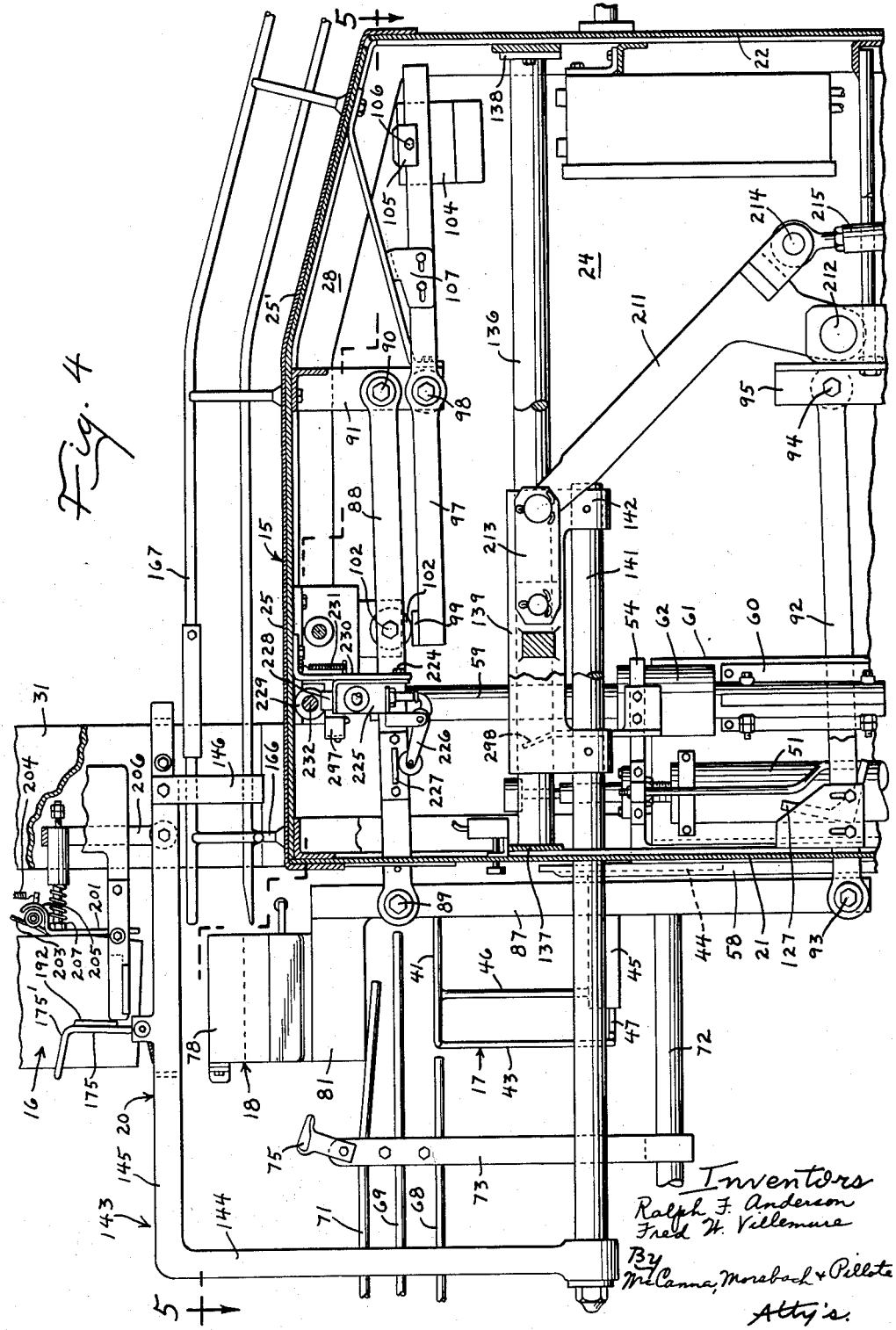

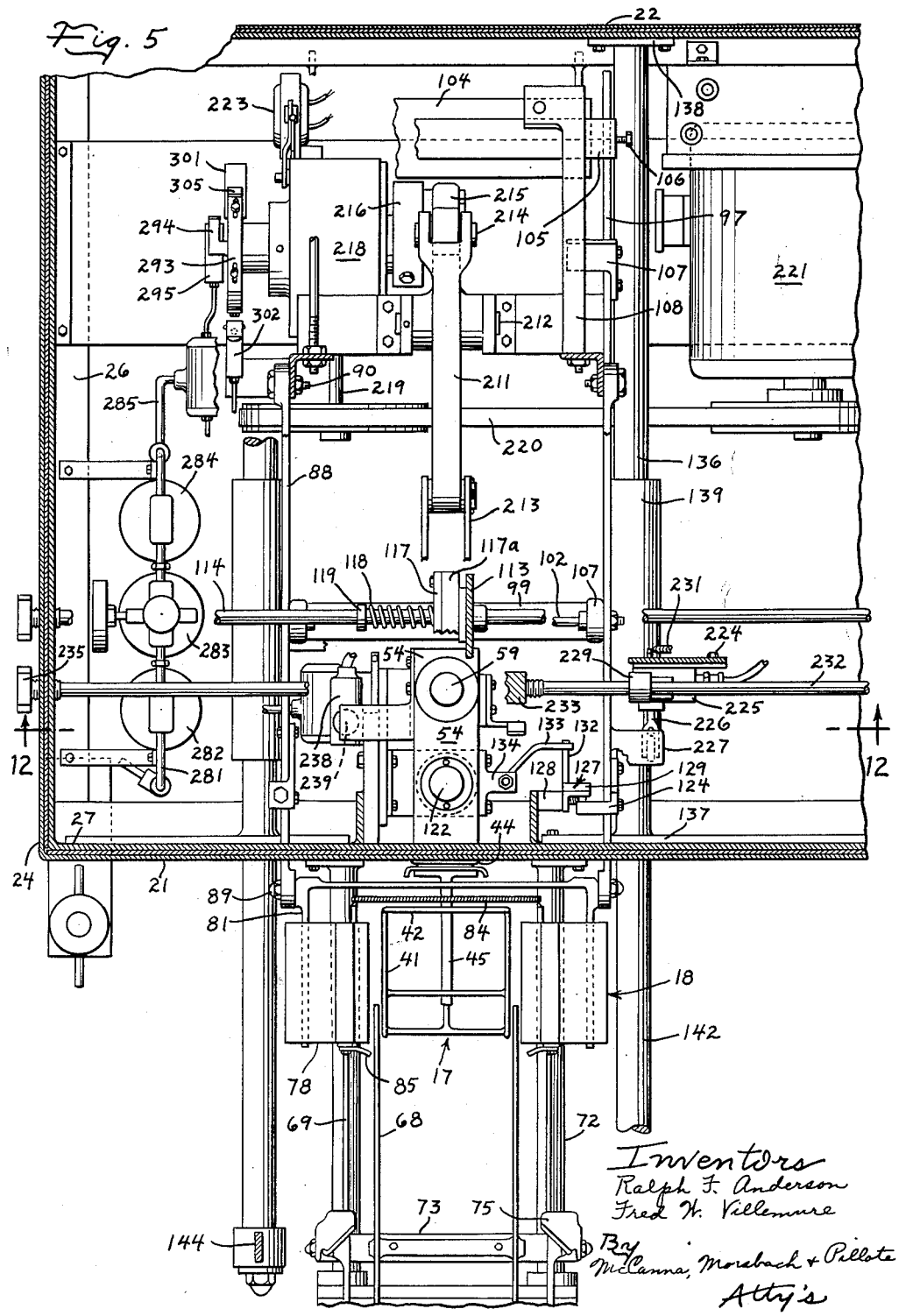

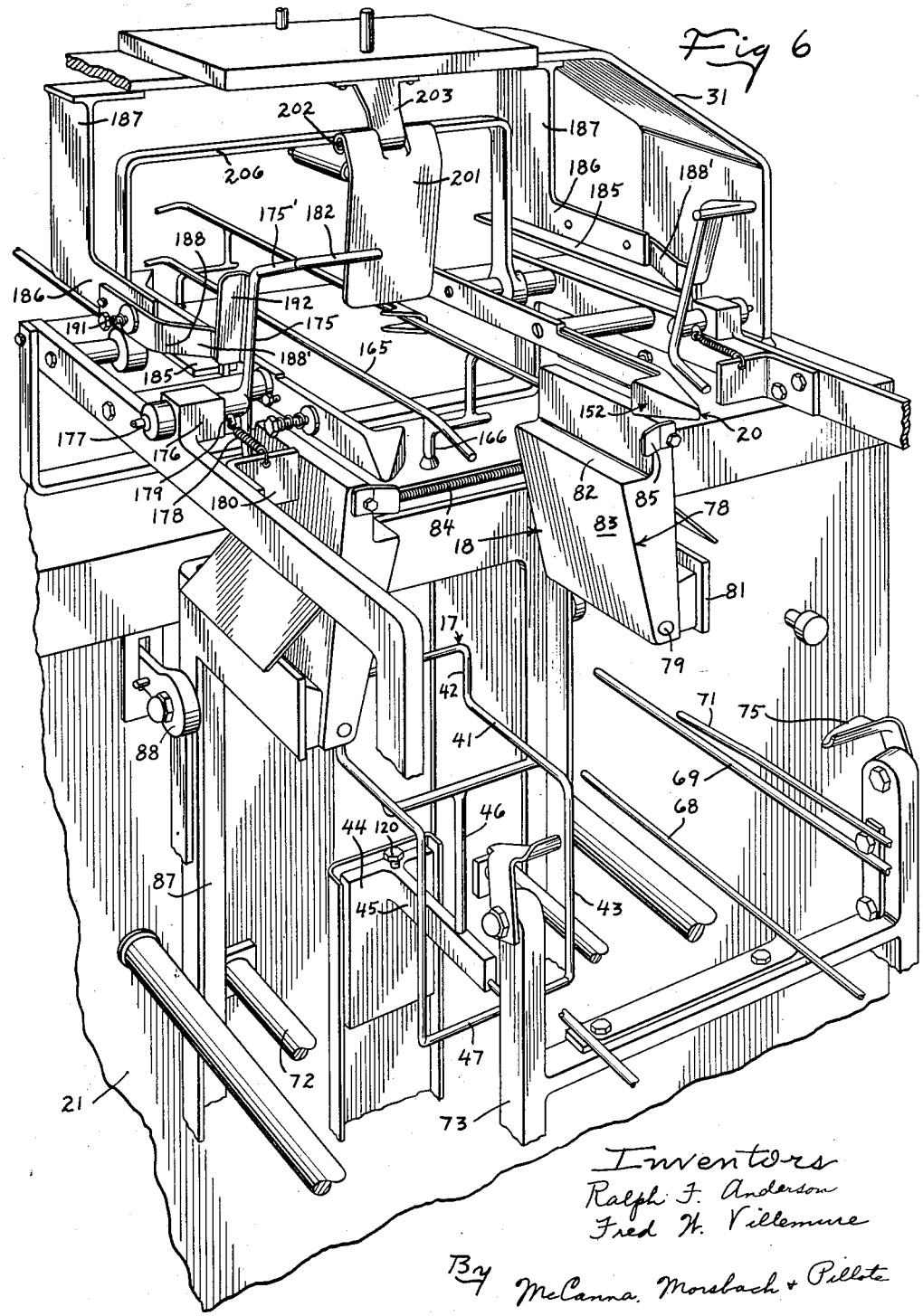

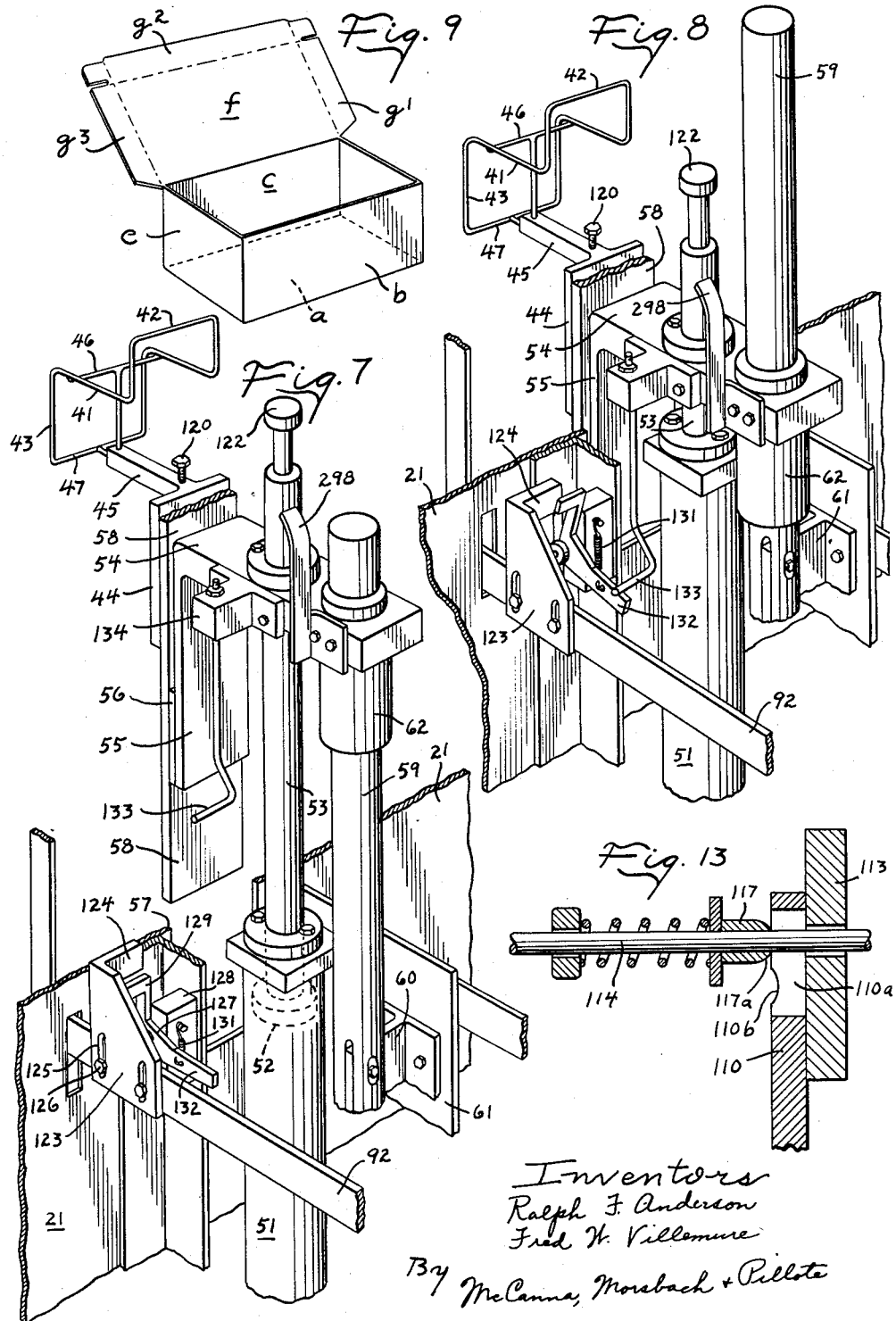

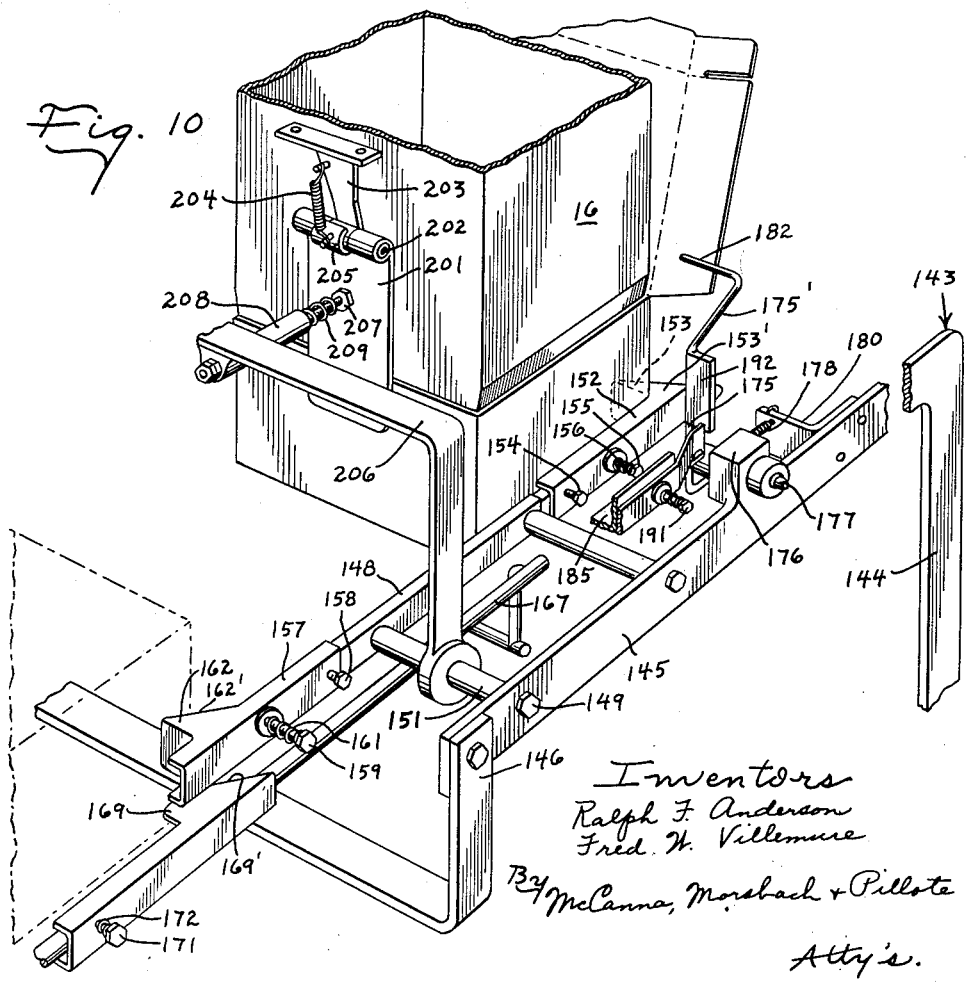

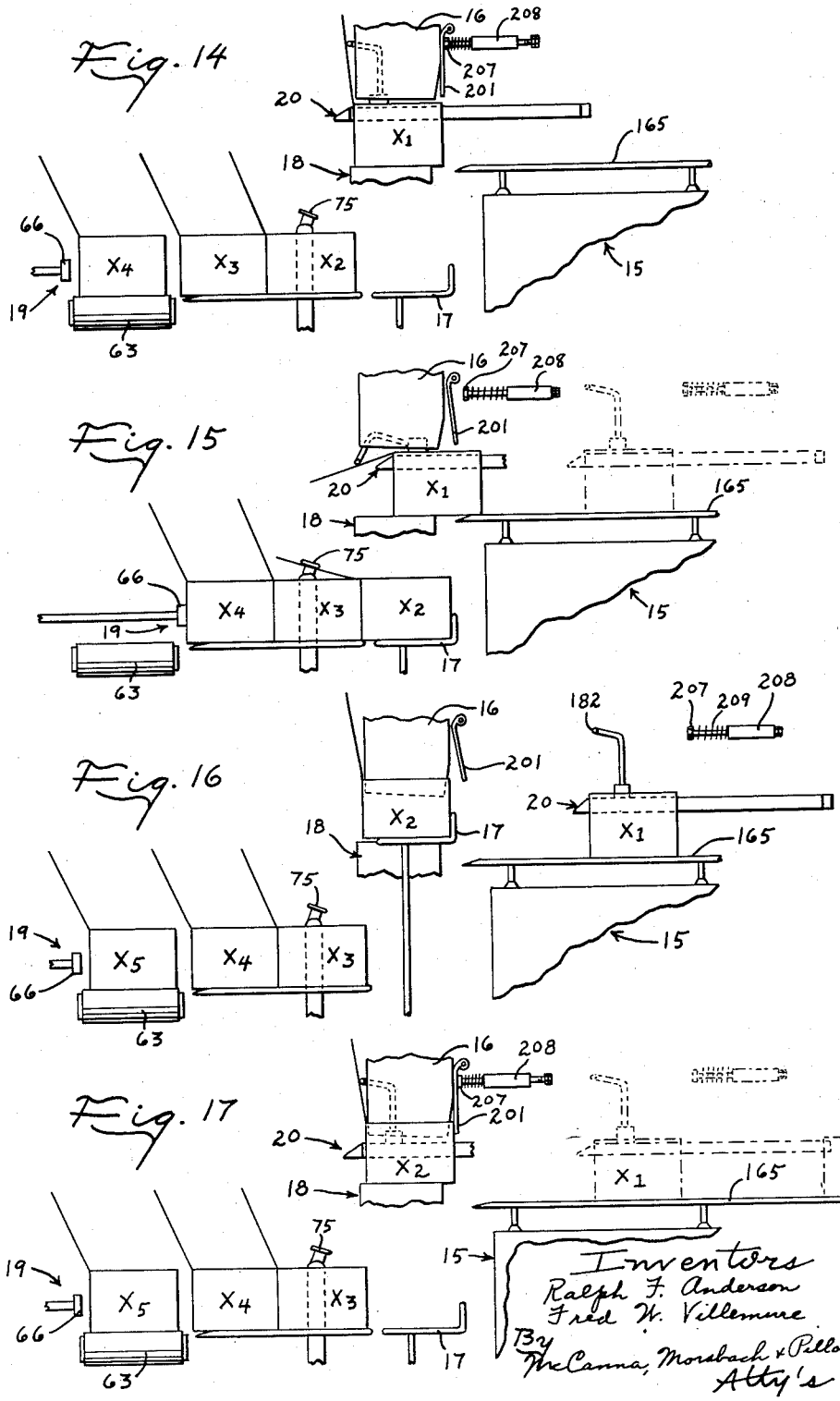

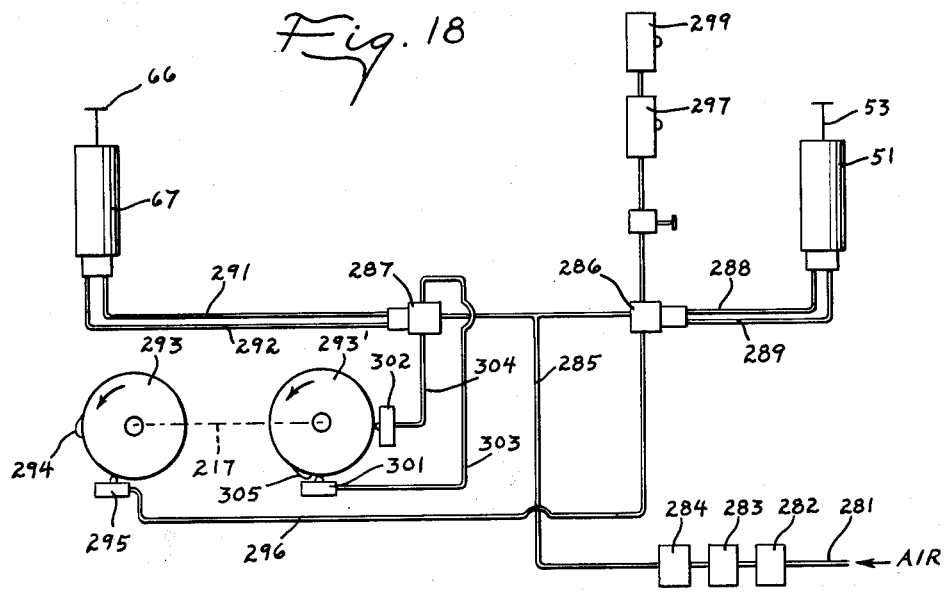
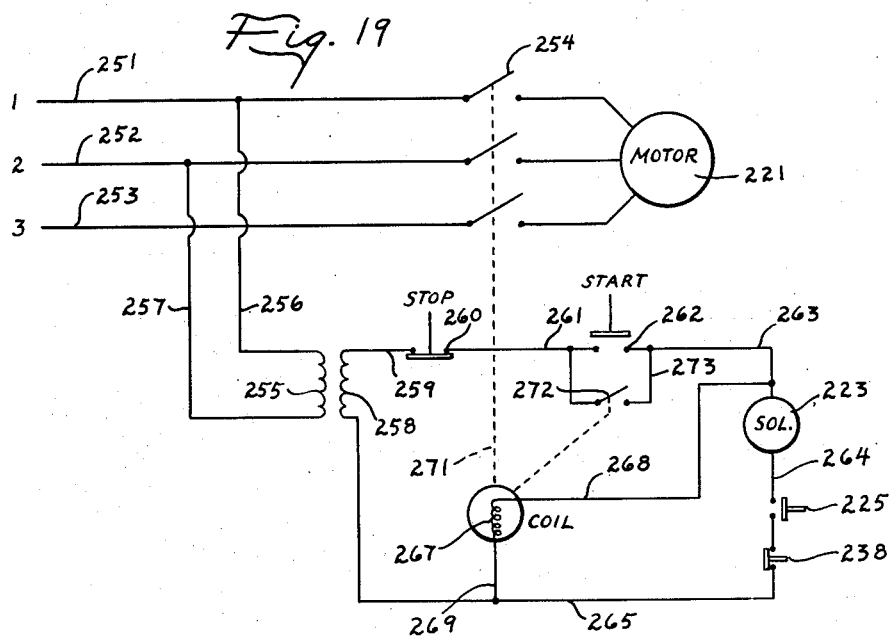

3,159,189
CARTON FILLING MACHINE
Ralph F. Anderson, 332 Calvin Park Blvd., Rockford, Ill., and Fred W. Villemure, Rockford, Ill.; said Villemure assignor to said Anderson
Filed May 7, 1963, Ser. No. 278,538
20 Claims. (Cl. 141—172)

This invention relates to container filling apparatus and particularly to an apparatus for filling containers with a fluent material.

The present invention is directed to improvements in container filling apparatus of the type shown in the copending application of Swan F. Anderson et al., Serial No. 65,060, filed October 26, 1960, now U.S. Patent No. 3,103,959. In general, that filling machine included a nozzle for dispensing a fluent material; an apparatus for intermittently elevating containers into filling position at the nozzle; apparatus for supporting the containers during filling; and transfer mechanism for moving the filled containers crosswise of the nozzle and away from the filling station.

An important object of this invention is to provide a container filling machine which enables accurate adjustment of the amount of material dispensed into the containers and which achieves accurate repetitive filling of successive containers.

Another object of this invention is to provide a container filling machine for filling containers with a fluent material, and in which the parts that handle the material can be readily cleaned and in which the operating mechanism for the filling apparatus is enclosed within a housing so as to avoid contamination of the parts that handle the material and to prevent damage to the operating mechanism during cleaning.

Another object of this invention is to provide a container filling machine which can accommodate relatively flexible containers and which avoids distortion and distention of such containers during filling.

A more particular object of this invention is to provide a container filling apparatus of the type wherein a container is elevated into position around the nozzle; moves downwardly as it is filled by material from the nozzle, and is then moved crosswise of the nozzle when it reaches a preselected position to shear off the material in the container from the material in the nozzle, and which filling apparatus has an improved arrangement for supporting the container for downward movement during filling to enable accurate control of the amount of material dispensed into each container.

Yet, another object of this invention is to provide a container filling apparatus of the type wherein the containers are elevated into position around the nozzle and then moved crosswise of the nozzle away from the filling station when the containers are filled, and which apparatus has an improved transfer mechanism for moving the containers away from the filling station.

Still another object of this invention is to provide a container filling machine for filling containers having hinged cover flaps on the top, and which container filling apparatus has an improved arrangement for depressing the cover flap during movement of the container crosswise of the nozzle to prevent the cover flap from striking the material as it emerges from the nozzle.

These, together with other objects and advantages of this invention will be more readily appreciated as the same becomes better understood by reference to the following detailed description when taken in connection with the accompanying drawings wherein:

FIG. 1 is a front view of the container filling machine;

FIG. 2 is a view of the one side of the container filling machine, with the side cover plate removed to illustrate parts of the operating mechanism;

FIG. 3 is a top plan view of the container filling machine with the filling nozzle removed;

FIG. 4 is a fragmentary vertical sectional view taken on the plane 4—4 of FIG. 1;

FIG. 5 is a fragmentary horizontal sectional view taken on the plane 5—5 of FIG. 4;

FIG. 6 is a fragmentary perspective view illustrating the container elevating mechanism; the container support mechanism and the transfer mechanism for moving the containers away from the filling station;

FIGS. 7 and 8 are fragmentary perspective views illustrating the container elevating mechanism in different moved positions;

FIG. 9 is a perspective view of a container of the type adapted to be filled by the present filling machine;

FIG. 10 is a fragmentary perspective view of the nozzle and outlet transfer mechanism;

FIG. 11 is a diagrammatic view illustrating the outlet transfer mechanism in different moved positions;

FIG. 12 is a fragmentary vertical sectional view taken on the plane 12—12 of FIG. 5;

FIG. 13 is a fragmentary sectional view through the brake apparatus shown in FIG. 12;

FIGS. 14–17 are diagrammatic views illustrating different moved positions of the container filling apparatus;

FIG. 18 is a schematic diagram illustrating the fluid control system for the filling machine; and FIG. 19 is a schematic diagram of the electrical controls for the filling machine.

The filling apparatus of the present invention is generally adapted for use in filling containers with fluent materials. The embodiment of the invention herein disclosed is specifically designed for filling containers with semi-solid or plastic materials such as ice cream, sherbet and the like, and is hereinafter described in connection with the filling of such materials. It is to be understood, however, that the invention is not to be construed as limited to use in filling containers with any specific material. In general, the container filling machine includes a support frame 15, a nozzle 16, an elevator mechanism 17 for raising a container into filling position around the nozzle, a container support mechanism 18 for supporting the containers during filling; an inlet conveyor mechanism 19 for advancing empty containers to the elevator mechanism, and an outlet conveyor mechanism 20 for moving filled containers crosswise of the nozzle and away from the filling station. The outlet conveyor 20 is arranged to move the filled container crosswise of the nozzle when the upper edge of the container is disposed adjacent the level of the underside of the nozzle to shear off the material in the container from the material in the nozzle and the elevator 19 is normally spaced below the outlet conveyor mechanism a distance greater than the height of a container to allow a succeeding empty container to move into position on the elevator before the filled container has been moved completely away from the filling station.

A container designated X of the type adapted to be filled by the filling apparatus is illustrated in FIG. 9 and, in general, includes a bottom wall $a$, spaced side walls $b$, $c$, end walls $d$, $e$, and a cover or closure flap $f$. Obviously, the proportions and size of the container can be varied widely, as well as the manner in which the various walls are formed and joined. While the container is shown with a single top closure flap, additional flaps can be employed on the other side wall and/or on the end walls, if desired. As shown, flaps $g1$ and $g3$ are provided on the edges of the top flap and arranged to be folded down and sealed to the side and end walls of the container.

The support frame 15 includes a front wall 21, a rear wall 22, spaced side walls 23 and 24 and a top wall 25. The various walls may be attached and supported in any desired manner and, as shown, are joined to bottom, upright and top angle members designated 26, 27 and 28. The several angle members 26–28 are preferably welded together to form a rigid support frame to which the front, rear, side and top walls are attached and which also support the operating mechanism described hereinafter.

The nozzle 16 is supported above the top wall 25 of the support frame and, as shown, is mounted on a generally U-shaped bridge member 31 which is attached to the top wall adjacent each end and which arches upwardly from the top wall. A nozzle mounting plate 32 is removably attached to the bridge member 31, as by thumb screws 33, and the nozzle mounting plate extends forwardly from the bridge 31 as shown in FIG. 2. The nozzle 16 is removably attached to the plate 32 as by fasteners 34 and extends downwardly adjacent the front side of the filling machine. The fluent material, such as the aforementioned plastic or semi-solid ice cream, sherbet or the like, is supplied to the nozzle 16 through one or more conduits 36 which are connected to the nozzle 16 by fittings 37 and which extend to remote freezers.

The container elevating mechanism 17 is disposed at the front side of the filling machine and includes a generally horizontally disposed container supporting platform 41, conveniently formed of spaced wires. The wires which form the platform 41 are bent upwardly adjacent their rear ends to form a rear container stop 42 that projects upwardly from the platform, and are bent downwardly at their forward ends to form a forward container stop 43 for interrupting the advance of succeeding containers when the elevator is raised. As best shown in FIGS. 6–8, a slide member 44 is mounted at the front of the machine for vertical sliding movement and has a forwardly projecting arm 45. The carton support platform 41 is mounted on the arm 45 by a generally T-shaped bracket 46, and the lower ends of the forward carton stops 43 are similarly attached to the end of the arm 45 by a T-shaped bracket 47.

The mechanism for raising and lowering the elevator is disposed inside the housing and, in the embodiment illustrated, includes a fluid operated cylinder 51 having a piston 52 (see FIG. 7) and a rod 53 attached to the piston and extending out of the upper end of the cylinder. The upper end of the piston rod 53 is connected to a cross head 54, and which cross head is connected in any suitable manner to the aforementioned slide block 44. As shown in FIGS. 7 and 8, the cross head 54 has a depending leg 55 and a block 56 is attached to the leg and extends forwardly through a slot 57 in the front wall 21 of the housing. A slide plate 58 overlies the front of the slot and is attached to the slide block 54 so that the latter moves in unison with the cross head 54. A guide is advantageously provided for the slide block and, as shown, includes a post 59 mounted by a bracket 60 on a support member 61 attached to the main frame. A sleeve 62 is slidably supported on the post and is attached to the slide block to guide the same during raising and lowering of the elevator. An apparatus, described hereinafter, is provided for controlling the flows of fluid to the cylinder 51 to effect raising and lowering of the elevator.

Various different types of inlet conveyor mechanisms 19 may be employed for advancing empty containers onto the elevator when the latter is lowered. A particular conveyor mechanism which has been found advantageous for feeding the containers to the elevator is shown in FIG. 3 and includes an endless type conveyor 63 which extends generally parallel to the front wall 21 of the filling machine and which is driven as by a drive mechanism 64. A stop arm 65 extends crosswise of the endless conveyor 63 to stop the containers in front of the filling machine and a transfer mechanism, herein shown in the form of a pusher 66 operated by a fluid cylinder 67, is provided for moving the empty containers crosswise of the conveyor 63 and toward the filling machine. The empty containers are supported during movement from the conveyor 63 onto the elevator by spaced carton support rails 68 which underlie the containers and extend from the conveyor 63 to a position alongside the support platform 41 of the elevating mechanism. Lateral carton guide rails 69 are provided along each side of the carton to laterally guide the same. In addition, elongated retainer members 71 are advantageously provided and, as shown in FIG. 6, are arranged to extend inwardly in overlying relation to the upper edges of the end walls of the cartons to prevent lifting of the cartons as they move along the support rails 68. In the embodiment illustrated, the rails 68–71 are supported on the front of the filling machine by spaced bars 72 which are attached to the front of the machine and project forwardly therefrom. A generally H-shaped frame 73 is attached to the forward ends of the bars 72 and extends upwardly therefrom. The support rails 68 are mounted on the web portion of the H-shaped bracket and the guide and retainer rails 69 and 71 are supported on the upright portions of the frame 73. In addition, generally L-shaped cover depressing fingers 75 are preferably provided on the upper ends of the bracket 73 and arranged to project inwardly to engage the hinged cover flap $f$ on the container to depress the same. A mechanism described hereinafter is provided for operating the pusher 66 in timed relation with the elevator to advance the containers onto the elevator when the latter is lowered.

The elevating mechanism 17 moves the empty container into position around the nozzle 16 and the container moves downwardly as it is filled by the material from the nozzle. The container support mechanism 18 is arranged to support the elevated container and to allow it to move downwardly during filling. The container support mechanism preferably includes a pair of support members 78, one adjacent each end of the container. The support members 78 are mounted for movement laterally apart to allow a container to move upwardly therebetween and, as shown, are pivotally supported by a horizontally extending pin 79 on opposite legs of a generally U-shaped bracket 81. The container support members have a generally horizontal container support ledge 82 arranged to underlie and support the container, and a cam face 83 shaped to engage the container and separate the support members as the container moves upwardly therebetween. The support members are yieldably moved inwardly into underlying relation to the elevated container and, as shown, are urged toward each other by spring 84 which is terminally attached to the support members 78. Container retaining fingers 85 are preferably provided adjacent the forward ends of the container support members 78 to aid in positioning the container thereon and to prevent movement of the container forwardly off the support members during reciprocation of the outlet transfer mechanism 20.

The container support members 78 are mounted for limited vertical movement to permit the container to move downwardly during filling. The mounting means for the container support members 78 is best shown in FIGS. 2 and 4, and is advantageously in the form of a parallelogram type linkage to minimize frictional resistance to vertical movement of the support members and to facilitate counterbalancing of the same. More particularly, the support means includes a pair of upright bars 87 disposed externally of the housing at the front side of the machine and connected to the U-shaped bracket 81 adjacent the rear end thereof. A pair of like upper links 88 are pivotally connected as by a pin 89 to a respective one of the bars 87, and the upper links extend through openings (not shown) in the front wall 21 of the housing and are pivotally supported as by a pin 90 adjacent their rear ends on a bracket 91 carried by the housing. A pair of similar lower links 92 are pivotally attached as by pins 93 to the bars 87 adjacent their lower ends, and the links 92 extend through openings (not shown) in the front wall and are pivotally connected as by pins 94 to brackets 95 on the housing. As will be seen from FIGS. 2 and 4, the length of the links 88 and 92 are substantially the same and the vertical spacing between the pivot pins 89, 93 and 90, 94 is also substantially the same so as to form a parallelogram type linkage which maintains the bar 87 generally upright as the links move up and down.

For reasons set forth hereinafter, provision is made for substantially counterbalancing the weight of the container support members 78, the mounting bracket 81 and the mounting means including the bars 87 and the links 88 and 92. In the embodiment shown, the counterbalancing means is in the form of laterally spaced arms 97 which are pivotally mounted intermediate their ends on a pin 98 conveniently carried by the brackets 91 which support the upper links 88. As shown, the pins 98 are positioned below and adjacent to the pins 90 and a cross piece 99 is attached to the forward ends of the arms 98. As best shown in FIGS. 4 and 12, the cross piece engages the upper links 88 intermediate the ends thereof and for this purpose, rollers 101 are mounted on a cross shaft 102 which is carried by the upper links 88 and extend therebetween. The rollers 101 engage the cross piece 99 on the arms 97 to provide substantially friction free engagement therebetween, and the rollers are retained against axial movement on the shaft as by collars 103. A counterbalance weight 104, conveniently formed in a plurality of separable sections to facilitate adjustment of the weight, is mounted on the other ends of the arms 97. The weight 104 is advantageously supported by brackets 105 on the arms 97 for sliding movement therealong to enable adjustment of the counterbalance force supplied to the parallelogram type linkage, and a means such as the screw 106 is provided for locking the weight to the arms 97, in the adjusted position thereof. A stop 107 is conveniently provided on the arms 97 and arranged to engage an abutment such as the brace arm 108, to limit downward movement of the parallelogram linkage. As will be noted from FIG. 4, the stop 107 is adjustable along the bracket to enable adjustment of the arms. Advantageously, the weight 104 is adjusted along the arm 97 to a position such that it substantially counterbalances the support member 78, bars 87 and links 88 and 92.

As the container on the support members 78 is filled, it moves downwardly until it reaches a preselected lower position in which the upper edge of the container is disposed closely adjacent the underside of the nozzle. At that time, apparatus described hereinafter is provided for moving the container crosswise of the nozzle to shear the material in the container from the material emerging from the nozzle. The container moves downwardly during filling under the weight of the material in the container and to some extent by the pressure exerted on the container by the material in the nozzle. In order to enable accurate control of the amount of material dispensed into the container, and to also inhibit free oscillation of the counterbalanced support means, a brake apparatus is provided. As shown in FIGS. 2, 12 and 13, the brake apparatus includes a brake member 110 conveniently attached to the cross shaft 102 and maintained in position thereon by spaced collars 111. The brake member 110 is disposed in rubbing engagement with the brake block 113 attached to the top 25 of the housing, and provision is made for selectively adjusting the braking pressure from externally of the housing. As best shown in FIG. 12, this includes a rod 114 that is threadedly supported in an opening 115 in the brake block 113, and which is slidably supported at 116 on the side 24 of the housing. A pressure applying member 117 having a rounded nose (17a, FIG. 13) is slidably supported on the rod 114 and a spring 118 is interposed between the pressure applying member and a collar 119 on the rod to yieldably urge the same against the brake member 110. The brake member 110 has a vertically elongated slot 110a that receives the rod 114 and, as will be seen, adjustment of the rod 114 can control the pressure applied to the brake member 110 and hence control the braking pressure. This provides a simple and accurate control for yieldably controlling downward movement of the container support members to thereby regulate the amount of material dispensed into each container. In order to inhibit bouncing or oscillation of the container support apparatus 18 when it is initially raised, the brake member is formed with a shallow depression 110b (FIG. 13) that is arranged to receive the rounded nose on the pressure applying member 117 when the support apparatus 18 is elevated to its upper position. This provides a detent type releasable brake for applying a relatively heavier braking force when the container support is in its fully elevated position. As the container support moved down, the detent releases and the brake thereafter functions to apply a relatively lighter braking pressure.

The container support members 78 are raised when the elevator is moved to its raised position, to properly support the elevated containers. For this purpose, a means, such as the adjustable screw 120, is provided on the elevator slide block 44 and arranged to engage a part on the container support apparatus such as the U-shaped support bracket 81 for the support members 78, when the elevator is raised. As will be seen, the screw 120 engages the bracket 81 as the elevator approaches its raised position and, preferably the screw is adjusted so that the container support platform 41 on the elevator moves to a level only slightly higher than the level of the container support ledges 82 on the support members 78. At that time, the support members can move inwardly into underlying relation with the container. The elevator continues its upward movement after the screw 120 engages the bracket 81, and the container support apparatus moves upwardly with the elevator. A stop 121 is provided for limiting upward movement of the container support apparatus and, as shown in FIG. 2, is conveniently in the form of an adjustable screw mounted on a bracket detached to one of the arms 88. The screw 121 is arranged to engage a part of the frame 15 to stop upward movement of the support apparatus 18. A vertically adjustable bumper or stop 122 is also preferably provided on the cross head 54 of the elevating apparatus to limit upward movement of the elevator. This bumper also engages a part such as the top of the frame 15.

The container elevating mechanism 17 is arranged to be lowered before the container is completely filled at the nozzle, to allow a succeeding container to move into position on the elevator. However, in order to positively assure that the elevating mechanism is lowered before the succeeding cycle of operation is initiated, a preferably mechanical interlock is provided for controlling downward movement of the container support members 78 until after the elevator has moved to its lower position. This interlock mechanism is best shown in FIGS. 7 and 8 and includes a lock member 123 attached to one of the links 92, and which lock member has a laterally extending portion 124. As will be noted, the lock member is supported for limited adjustment on the links 92, by means of slots 125 and fasteners 126. A latch member 127 is pivotally mounted, as on a block 128 attached to the front wall 21 of the housing and has a latch finger 129 arranged to underlie and engage the lock portion 124, when the links 92 are above their lowered position shown in FIG. 8. The latch 127 is yieldably urged into its latched position by a spring 131 attached to the latch and to the block 128 as shown in FIGS. 7 and 8, and a striker 132 is provided on the latch at the side of the latch pivot remote from the finger 129. The striker 132 is disposed in the path of travel of an actuator 133 attached to the elevating mechanism 17, and is conveniently mounted by a bracket 134 on the cross head 54. As will be seen, when the elevator is raised, the latch is released and is yieldably urged to its latched position so as to positively lock the container support members against movement to a fully lowered position. However, as the elevator is lowered, the actuator 133 engages the striker 132 on the latch, as shown in FIG. 8, and moves the same to its released position so that the container support members can move downwardly.

The outlet transfer mechanism 20 is arranged to move the cartons crosswise of the nozzle when the cartons are filled. A simplified transfer mechanism which minimizes the number of moving parts disposed externally of the housing, and which facilitates cleaning of those parts of the machine which handle the material without damage to the operating mechanism for the transfer mechanism, is best shown in FIGS. 4 and 10 of the drawings. More particularly, the outlet transfer mechanism includes a pair of slide rails or bars 136 which extend generally horizontally, and which are secured to the front and rear walls of the housing by brackets 137 and 138. A slide member 139 is mounted on each rail 136 for reciprocation therealong, and a rod 141 is attached to depending bosses 142 on the slides, for movement therewith. The rods extend forwardly through openings (not shown) in the front wall, and the outlet transfer mechanism 20 is supported on the rods by generally L-shaped brackets 143 each having an upright leg 144 non-rotatably attached to the forward ends of the rods 141, and a generally horizontal leg 145 extending rearwardly from the upper end of the legs 144 at a level above the top wall 25 of the housing. The rearward ends of the legs 145 are preferably rigidly interconnected by a U-shaped bracket 146 to maintain the legs 145 in spaced parallel relation. An elongated transfer member 148 is attached to each of the legs 145 for movement therewith, and as best shown in FIG. 10, the transfer members are supported on the legs 145 by bolts 149 and spacer members 151. The transfer members are supported at a level below the lower end of the nozzle 16 and closely adjacent opposite sides thereof to guidably engage the opposed sides of the container therebetween. A first container engaging member 152 is mounted on each of the transfer members 148 and is formed with a laterally extending container engaging finger 153. As shown, the body portion of the member 152 has a generally U-shaped cross section which straddles the transfer member 148, and the member 152 is supported for lateral shifting movement relative to the transfer member by pins 154 and 155. A spring 156 is provided on one of the fasteners to yieldably urge the member 152 into its container engaging position and the finger 153 is formed with a cam face 153' at the front side thereof which is adapted to engage the carton during retraction of the transfer member and cam the container engaging member laterally outwardly to by-pass the container. The transfer members 148 are reciprocated in a manner described hereinafter from a retracted position through a distance somewhat greater than the length of the carton to an extended position, and are then retracted to the initial position shown in FIG. 10. A second container engaging member 157 is also advantageously provided on each transfer member 148 to advance the containers a succeeding step during the subsequent reciprocation of the transfer mechanism. As shown in FIG. 10, the member 157 also has a generally U-shaped cross section which straddles the transfer member 148 and is supported thereon by fasteners 158 and 159 for limited lateral shifting movement relative to the transfer member. A spring 161 yieldably urges the member 157 into its container engaging position and the member 157 has a laterally extending finger 162 which is arranged to engage a carton and advance the same. The forward edge 162' of the finger is inclined so that the finger 162 is cammed outwardly by engagement with the container, during retraction of the transfer mechanism.

The containers are supported during movement crosswise of the nozzle by the shoulders 82 on the container support members 78 and, as the containers move off the support members, they move onto a container support herein shown in the form of spaced rails 165 conveniently mounted as by posts 166 on the top wall 25 of the housing. As best shown in FIGS. 2 and 4, the top wall of the housing includes a downwardly inclined rear portion 25' and the rails 165 similarly slope downwardly along the rear portion of the housing. Lateral container guide rails 167 are also mounted on the top wall of the housing and extend along opposite sides of the path of movement of the container to laterally guide the same. In order to prevent retrograde movement of the containers during retraction of the transfer mechanism, a laterally shiftable carton stop member 168 is mounted on the guide rails 167. As best shown in FIG. 10, the carton stop member includes an inwardly extending finger 169 having a cam nose 169' on the lead edge thereof. The stop member 168 has a U-shaped cross section which straddles the rail 167 and is supported for limited lateral shifting movement by means of a fastener 171 and spring 172.

Apparatus is provided for depressing the cover on the container during movement of the container crosswise of the nozzle to prevent the cover from striking against the material emerging from the nozzle. The cover depressing apparatus is best shown in FIGS. 5 and 10 and includes an arm 175 which is pivotally mounted in a block 176 on a respective one of the horizontal legs 145, for pivotal movement about a generally horizontal axis 177 perpendicular to the transfer member 148. The arm is yieldably urged to a generally upright position by a spring 178 that is terminally attached to a finger 179 on the axes 177 and a bracket 180 on the leg 145. The arm 175 has a forwardly projecting portion at its upper end designated 175' and a laterally extending finger 182 shaped to extend inwardly and into engagement with the cover on the container. The cover depressing apparatus is thus supported for movement with the transfer mechanism and is also swingable relative thereto about a horizontal axis. A cam track is provided alongside the path of movement of the arm 175 to swing the arm downwardly to depress the cover, during extension of the transfer mechanism, and which cam track is so arranged as to allow the arm to remain generally upright during retraction of the transfer mechanism so as to position the arm at the rear side of the cover on the next succeeding container at the filling station. As best shown in FIGS. 3, 6 and 11, the cam track includes a generally horizontally disposed member 185 which is supported by a generally L-shaped bracket including horizontal leg 186 and upright leg 187 on the bridge 131. A cam member 188 is mounted on the leg 186 for limited lateral shifting movement relative thereto, as by fasteners 189 and 191. The member 188 has an inwardly extending nose portion 188' and the cam member is yieldably urged to the position shown in FIGS. 3 and 6 by a spring 191. A cam plate 192 is provided on the lower depressor arms 175, and the nose portion 188' of the cam member 188 extends into the path of movement of the cam plate 192 so as to swing the arm 175 downwardly to the underside of the member 185 during extension of the transfer mechanism to thereby depress the cover on the container and hold the same in its depressed condition as the container moves across the nozzle (see FIG. 11). The cam plate 192 moves out from beneath the member 185 before the transfer mechanism reaches its fully extended position and the arm can then swing upwardly under the bias of the spring 178. During retraction, the arm remains in its upwardly extending position and the lateral shiftable cam member 188 moves outwardly to allow the plate 192 to pass thereby during retraction.

The containers are generally formed of a relatively thin material, for example cardboard, plastic or the like, and are subject to distortion during filling. The trailing side of the container is effectively reinforced at its upper edge by the hingedly connected cover so that distortion of the trailing side presents little problem. The end walls of the container are laterally supported by the carton support members 78. However, the lead wall of the container sometimes tends to bow outwardly as the container is filled, resulting in the dispensing of an excess amount of material into the container and also distortion of the container to an extent that reclosing of the cover is impeded. In order to overcome this difficulty, a container support member 201 is provided for supporting the lead side of the container during filling. The container support member is mounted for movement into and out of engagement with the side wall of the container at the nozzle and, as shown in FIGS. 4, 6 and 10, is supported for swinging movement about a generally horizontal pin 202 carried by a bracket 203 also attached to the bridge 31. The axis of the pin 202 is disposed well above the lower end of the nozzle and the member 201 is yieldably urged to a retracted position by a spring 204 (see FIG. 4). A stop finger 205 is provided on the support member 201 and is arranged to engage the bracket 203 to limit swinging movement of the support member to a position as shown in FIG. 15. Apparatus is provided for moving the support member back into engagement with the lead side of the container, when the container is in at least partial telescoping relation with the nozzle. For this purpose, a generally U-shaped bracket 206 is mounted on the transfer members, as by fixed engagement with the spacers 151. A plunger 207 is slidably supported in a holder 208 carried by the bracket 206, and which plunger is yieldably urged forwardly to an extended position by a spring 209. Thus, as the transfer mechanism is retracted, the plunger moves forwardly therewith and engages the side support member 201 to move the same downwardly and thereby press the lead side of the container against the side of the nozzle. The support member retains the lead side of the container against the nozzle until the container is filled at which time the container moves below the lower end of the support member 201. During extension of the transfer mechanism, the container support member 201 is retracted to allow the container elevating mechanism to move a subsequent container into position at the nozzle.

The drive for reciprocating the outlet transfer mechanism 20 is best shown in FIGS. 2 and 4 and includes a bell crank 211 pivotally mounted as at 212 on the bracket 95 and pivotally connected by links to the slide member 139. The crank is also pivotally connected at 214 to a link 215 which is connected to a crank 216 (FIGS. 2 and 5). The crank 216 is connected to the output shaft 217 of a one revolution clutch 218, and the latter has its input shaft 219 connected through a belt and pulley arrangement 220 to a drive motor 221. During operation of the machine, the motor runs continuously and the clutch is intermittently operated to drive the output shaft through one revolution, in response to electro-responsive operator 223, herein shown in the form of a solenoid.

A switch mechanism 225 is provided for automatically operating the clutch when the container supports 78 move out of a position with the top of the container adjacent the lower end of the nozzle. As shown in FIG. 4, the switch 225 has a swingably mounted actuator 226 which is arranged to be engaged by a lateral member 227 on one of the links 88, when the support members 78 move down to a preselected position. The switch is normally open and, when closed, energizes the solenoid 223 to drive the transfer mechanism through one revolution. In order to enable accurate control of the position of the support members at which the switch 225 is actuated, the latter is arranged for limited adjustment. As best shown in FIG. 12, the switch 225 is pivotally supported by a pin 224 on a bracket 230 attached to the top 25 of the housing. A cam member 228 is mounted on the switch and a cam follower 229 engages the member 228 to control the vertical position of the switch. The switch 225 is yieldably urged upwardly into engagement with the follower 229 by a spring 231, and the follower is mounted for adjustment relative to the cam 228. As best shown, in FIGS. 5 and 12, the follower is supported on a rod 232 which is threadedly supported at a block 233 and is supported at 234 on the side walls 23 and 24 of the housing. The position of the cam follower 229 can be adjusted by turning the knob 235 and this in turn, controls the position of the switch 225 and hence the level of the container support member 78 at which the switch is closed. A safety switch 238 is preferably connected in series with the switch 225 and arranged to prevent energization of the clutch operating solenoid 223 if the elevator, for any reason, has not returned to its normal or lower position. The switch 238 is of the normally closed type and, as shown in FIGS. 2 and 5, it is conveniently mounted alongside the path of travel of the crosshead 54. A switch actuating finger 239 is provided on the crosshead and arranged to actuate the switch 238 when the elevator is in its lowered position, to close the switch and enable completion of the circuit to the solenoid 223, when the switch 225 is operated.

The electrical controls for the machine are shown in FIG. 19. Power is supplied to the drive motor 221 through conductors 251–253 and relay operated switch 254. The primary 255 of a transformer is connected by conductors 256 and 257 to a pair of the wires 251 and 252. The secondary 258 of the transformer is connected through a conductor 259 to a normally closed stop switch 260, and which stop switch is connected in series through conductor 261 to a normally open start switch 262. The start switch is connected through conductor 263 to the solenoid 223 and the switches 225 and 238 are connected in series with each other and with the solenoid 223 by a conductor 264. The circuit to the transformer is completed by a conductor 265. A relay coil 267 is connected by a conductor 268 to the conductor 263, and by a conductor 269 to the conductor 265. The coil has an actuator diagrammatically indicated at 271 which operates the relay switch 254, and which actuator also operates a holding switch 272 which is connected in parallel with the start switch 262 as by conductors 273. As will be seen, closing of the start switch completes a circuit to the coil 267 to thereby start the motor 221. The coil also closes the holding switch 272 to maintain a circuit to the coil when the start switch is released. The coil can then be deenergized only by pushing the stop switch 260. The solenoid 223 is not energized when the start switch is closed, but remains deenergized until the container fill switch 225 is closed.

The elevator mechanism 17 and the pusher 66 for advancing empty containers onto the elevator are preferably fluid operated and the fluid control circuit is diagrammatically shown in FIG. 18. Air is supplied to the fluid operated controls from an air line 281 through an air cleaner 282, regulating valve 283 and air lubricator 284 and through a line 285 to pilot operated flow reversing valves 286 and 287. The flow reversing valve 286 is connected through conduits 288 and 289 to the elevator cylinder 51 to reversibly supply and exhaust fluid therefrom and the valve 287 is connected through conduits 291 and 292 to the cylinder 67 for operating the pusher 66. Fluid is supplied and exhausted from the cylinder 51 in timed relation with the movement of the transfer mechanism and, as shown, a cam 293 is mounted on the output shaft 217 of the one revolution clutch. The cam has a first lobe 294 thereon arranged to operate a bleeder valve 295 which is connected through a conduit 296 to the pilot operated flow reversing valve 286. When the cam lobe operates the valve 295, it closes the normally open bleeder valve and applies pressure to the pilot operated valve 286 to operate the same to a position in which it supplies fluid under pressure to the underside of the piston in the cylinder 51 to elevate the same. A second bleeder valve 297 is mounted above the crosshead 54 to be operated by an actuating finger 298 carried by the crosshead 54, when the elevator reaches its raised position. This closes the normally open bleeder valve 297 and operates the flow reversing valve 286 to its other position to return the piston in the cylinder 51 to its lowered position. A manually operable safety valve 299 is also preferably provided to permit interruption of the elevator when the safety valve is depressed, the other flow reversing valve 287 is operated under the control of bleeder valves 301 and 302 which are connected to the flow reversing valve by tubes 303 and 304 respectively. As diagrammatically shown in FIG. 18, the bleeder valves 301 and 302 are operated from a cam 293' having a lobe 305. In practice, however, the cams 293 and 293' can be the same (see FIG. 5) and the lobes 294 and 305 merely axially offset so that the lobe 294 will operate valve 295 and the lobe 305 will operate valves 301 and 302. As shown, the lobe 305 sequentially operates the normally open bleeder valves 301 and 302 to respectively extend and retract the pusher 66 as the one revolution shaft 217 completes its revolution.

The operational sequence of the machine is diagrammatically shown in FIGS. 14–17. The various parts are diagrammatically illustrated in FIG. 14 in the positions assumed when a container X1 at the nozzle has just been filled. When the container reaches this position in which its upper edge is spaced slightly below the nozzle 16, the switch 225 is operated to energize the clutch solenoid 223 and operate the one revolution shaft 217 through one revolution. As the shaft begins to rotate, the outlet transfer mechanism 20 begins to move the container X1 across the nozzle as shown in FIG. 15. Also, as the shaft 217 begins to rotate, the cam lobe 305 operates the bleeder valve 301 to extend the pusher 66 and advance a succeeding container X2 onto the elevator 17. As the shaft 217 continues rotating, the outlet transfer mechanism moves the container X1 completely away from the filling station below the nozzle as shown in FIG. 16. As the container X1 clears the nozzle, the lobe 294 on the cam 293 operates the bleeder valve 295 to move the flow reversing valve 286 to a position to extend or raise the elevator 17. This moves a succeeding container X2 into position around the nozzle 16, as shown in FIG. 16. In addition, during this period, the cam lobe 305 engages the bleeder valve 302 to operate the reversing valve 287 and retract the pusher 66. When the elevator reaches its raised position, it operates the bleeder valve 297 and automatically retracts the elevator to its lower position shown in FIG. 16 ready to receive a succeeding container X3. The container support members 78 support the container during filling and allow it to move downwardly under the control of the counterbalance weight 104 and the brake mechanism 110–113 previously described. The latter can be adjusted from externally of the machine to enable accurate control of the amount of material dispensed into each container, while the machine is operating.

As the outlet transfer mechanism 20 moves toward its extended position, the cover depressor-arm 175 is swung downwardly to depress the cover flap below the nozzle. In addition, the side support member 201 is released to allow the same to swing outwardly to a position such as shown in FIG. 15. As will be seen from FIG. 16, the timing is such that the elevator moves the container into position around the nozzle before the outlet transfer mechanism has been returned to its fully retracted position, so that the side support member 201 diverges outwardly relative to the nozzle to allow the lead side of the container to move upwardly around the nozzle. During the subsequent retraction of the transfer member, the container engaging members 152 are cammed laterally apart to pass around the container at the nozzle.

We claim:

1. A container filling apparatus comprising a nozzle having a downwardly facing discharge opening for discharging a fluent material, a container lifting member positioned below said nozzle, means for moving said lifting member from a lower position to a raised position to elevate a container into registry with the nozzle and for thereafter lowering said lifting member back to said lower position, container support means separate from said elevating means and engageable with said container when the latter is elevated for supporting the container when the lifting member is lowered, means mounting said container support means for limited vertical movement to permit the container to move downwardly as it is filled by the nozzle, and counterbalance means operatively connected to said mounting means for substantially counterbalancing the weight of said vertically movable container support means and the mounting means therefor.

2. A container filling apparatus comprising a nozzle having a downwardly facing discharge opening for discharging a fluent material, a container lifting member positioned below said nozzle, means for moving said lifting member from a lower position to a raised position to elevate a container into registry with the nozzle and for thereafter lowering said lifting member back to said lower position, container support means separate from said elevating means and engageable with said container when the latter is elevated for supporting the container when the lifting member is lowered, means mounting said container support means for limited vertical movement to permit the container to move downwardly as it is filled by the nozzle, and counterbalance means including a lever operatively connected to said mounting means and a weight adjustably mounted on said lever for substantially counterbalancing the weight of said vertically movable container support means and the mounting means therefor.

3. A container filling apparatus comprising a nozzle having a downwardly facing discharge opening for discharging a fluent material, a container lifting member positioned below said nozzle, means for moving said lifting member from a lower position to a raised position to elevate a container into registry with the nozzle and for thereafter lowering said lifting member back to said lower position, container support means separate from said elevating means and engageable with said container when the latter is elevated for supporting the container when the lifting member is lowered, means mounting said container support means for limited vertical movement to permit the container to move downwardly as it is filled by the nozzle, and counterbalance means operatively connected to said mounting means for substantially counterbalancing the weight of said vertically movable container support means and the mounting means therefor, and brake means operatively connected to said mounting means for yieldably retarding vertical movement of said container support means, said brake means inhibiting free vertical oscillation of said container support means and the mounting means and cooperating with said counterbalance means to control the weight of the material in the container necessary to move the container downwardly.

4. A container filling apparatus comprising a nozzle having a downwardly facing discharge opening for discharging a fluent material, a container lifting member positioned below said nozzle, means for moving said lifting member from a lower position to a raised position to elevate a container into registry with the nozzle and for thereafter lowering said lifting member back to said lower position, container support means separate from said elevating means and engageable with said container when the latter is elevated for supporting the container when the lifting member is lowered, means mounting said container support means for limited vertical movement to permit the container to move downwardly as it is filled by the nozzle, means for elevating said container support means to an elevated position when said lifting member is raised, counterbalance means operatively connected to said mounting means for substantially counterbalancing the weight of said vertically movable container support means and the mounting means therefor, and brake means for yieldably retarding vertical movement of said container support means.

5. The combination of claim 4 wherein said brake means includes means operative to apply a relatively higher braking pressure when the container support means is in its elevated position than when the support means moves out of its elevated position to inhibit oscillation of the support means when it is initially raised and to yieldably oppose downward movement of the container support means.

6. The combination of claim 4 wherein said brake means includes a stationary brake member, a movable brake member operatively connected to said mounting means for the container support means, a pressure applying member engaging said movable brake member, means yieldably urging said pressure applying member in a direction to press the movable brake member against the stationary brake member, said movable brake member having a shallow depression therein for receiving said pressure applying member when the support means is in its elevated position.

7. A container filling apparatus comprising a nozzle having a downwardly facing discharge opening for discharging a fluent material, a container lifting member positioned below said nozzle, means for moving said lifting member from a lower position to a raised position to elevate a container into registry with the nozzle and for thereafter lowering said lifting member back to said lower position, container support means separate from said elevating means and engageable with said container when the latter is elevated for supporting the container when the lifting member is lowered, means mounting said container support means for limited vertical movement to permit the container to move downwardly as it is filled by the nozzle, said mounting means including a lever pivotally supported for movement in a generally vertical plane, means operatively connecting one end portion of said lever to said container support means, and counterbalance weight means operatively connected to said lever to yieldably oppose downward movement of said support means.

8. A container filling apparatus comprising a support frame, a nozzle having a downwardly facing discharge opening for discharging a fluent material, a container lifting member positioned below said nozzle, means for moving said lifting member from a lower position to a raised position to elevate a container into registry with the nozzle and for thereafter lowering said lifting member back to said lower position, container support means separate from said elevating means engageable with a container when the latter is elevated for supporting the container when the lifting member is lowered, means mounting said container support means on said frame for limited vertical movement to permit the container to move downwardly as it is filled by the nozzle, means operative when the support means moves down to a preselected lower position for moving the container crosswise of the nozzle, said mounting means including a parallelogram type linkage pivotally supported on said frame for swinging movement in an upright plane.

9. A container filling apparatus comprising a support frame, a nozzle having a downwardly facing discharge opening for discharging a fluent material, a container lifting member positioned below said nozzle, means for moving said lifting member from a lower position to a raised position to elevate a container into registry with the nozzle and for thereafter lowering said lifting member back to said lower position, container support means separate from said elevating means engageable with a container when the latter is elevated for supporting the container when the lifting member is lowered, means mounting said container support means on said frame for limited vertical movement to permit the container to move downwardly as it is filled by the nozzle, means operative when the support means moves down to a preselected lower position for moving the container crosswise of the nozzle, said mounting means including a first lever means pivotally mounted on said frame for swinging movement in an upright plane and operatively connected to said container support means to support the latter for limited vertical movement, a second lever means pivotally mounted on said frame for swinging movement in an upright plane and having means on one end portion engaging said first lever means intermediate the ends of the latter, and weight means mounted on the other end portion of said second lever means for counterbalancing said mounting means and said support means.

10. The combination of claim 9 including brake means on said frame engaging said first lever means for yieldably retarding vertical movement of the first lever means and the container support means, said brake means being adjustable to regulate the braking action for control of the amount of material dispensed into the container.

11. A container filling apparatus comprising a support frame, a nozzle having a downwardly facing discharge opening for discharging a fluent material, a container lifting member positioned below said nozzle, means for moving said lifting member from a lower position to a raised position to elevate a container into registry with the nozzle and for thereafter lowering said lifting member back to said lower position, container support means separate from said elevating means engageable with a container when the latter is elevated for supporting the container when the lifting member is lowered, means mounting said container support means on said frame for limited vertical movement to permit the container to move downwardly as it is filled by the nozzle, means operative when the support means moves down to a preselected lower position for moving the container crosswise of the nozzle, and interlock means for preventing said support means from moving downwardly to said preselected lower position until after said container lifting member has been returned to its lower position to thereby prevent movement of a filled container crosswise of the nozzle until the lifting member has been lowered to a position to receive a succeeding container.

12. A container filling apparatus comprising a support frame, a nozzle having a downwardly facing discharge opening for discharging a fluent material, a container lifting member positioned below said nozzle, means for moving said lifting member from a lower position to a raised position to elevate a container into registry with the nozzle and for thereafter lowering said lifting member back to said lower position, container support means separate from said elevating means engageable with a container when the latter is elevated for supporting the container when the lifting member is lowered, means mounting said container support means on said frame for limited vertical movement to permit the container to move downwardly as it is filled by the nozzle, means operative when the support means moves down to a preselected lower position for moving the container crosswise of the nozzle, latch means for preventing said support means for moving downwardly to said preselected lower position until after said container lifting member has been returned to its lower position to thereby prevent movement of a filled container crosswise of the nozzle until the lifting member has been lowered to a position to receive a succeeding container.

13. An apparatus for filling containers of the type having lead and trail side walls, end walls extending between the side walls, and a cover hinged to said trail side wall for closing the top of the container, said apparatus including a support frame, a nozzle mounted on the frame and having a downwardly facing opening for discharging fluent material, a container lifting member positioned below the nozzle, means for moving said lifting member from a lower position to a raised position to elevate a container into registry with the nozzle, transfer means operative when the container is filled for moving the container crosswise of the nozzle, with said trail side wall and cover for the container at the trailing side of the container, said transfer means including spaced elongated transfer members extending generally horizontally along opposite ends of the container, means supporting said transfer member for reciprocation in a direction lengthwise thereof from an initial position to an extended position and back, container engaging fingers on said transfer member engageable with a container for moving the same crosswise of the nozzle as the transfer members are extended, a cover depressing arm mounted on at least one transfer member for movement bodily therewith, said cover depressing arm being mounted for pivotal movement about a generally horizontal axis transverse to the transfer member and having a laterally extending cover engaging finger thereon spaced from the pivot axis of the arm, means yieldably urging the arm to a normal position in which the arm extends upwardly and the cover engaging finger is disposed above the lower end of the nozzle for engagement with the cover, arm actuating means on said frame engageable with arm as the transfer members are extended for swinging the arm downwardly to depress the cover on the container as the container is moved crosswise of the nozzle, said arm actuating means releasing said arm after the container has moved away from the nozzle to allow the arm to return to its normal position, said arm by-passing said arm actuating means during retraction of the transfer members so that the arm remains in an upwardly extending position during retraction for engagement with the cover on a succeeding container.

14. The combination of claim 13 wherein arm actuating means comprises a cam member engageable with the arm during extension of the transfer members, said cam member being mounted on said frame for movement laterally of the transfer member and being shaped to cam outwardly during retraction of the transfer members to allow by-passing of the arm.

15. An apparatus for filling containers of the type having lead and trail side walls, end walls extending between the side walls, and a cover hinged to said trail side wall for closing the top of the container, said apparatus including a support frame, a nozzle mounted on the frame and having a downwardly facing opening for discharging fluent material, a container lifting member positioned below the nozzle, means for moving said lifting member from a lower position to a raised position to elevate a container into registry with the nozzle, transfer means operative when the container is filled for moving the container crosswise of the nozzle, with said trail side wall and cover for the container at the trailing side of the container, said transfer means including spaced elongated transfer members extending generally horizontally along opposite ends of the container, means supporting said transfer member for reciprocation in a direction lengthwise thereof from an initial position to an extended position and back, container engaging fingers on said transfer member engageable with a container for moving the same crosswise of the nozzle as the transfer members are extended, means for preventing distortion of the lead side wall of the container during filling, said last mentioned means including a side support member movable into and out of engagement with the lead side wall of the container at the nozzle, and means operative when the transfer members are in their initial position for moving said side support member into engagement with the lead side wall of the container at the nozzle and operative when the transfer members are extended to move said side support member out of engagement with the lead side wall of the container at the nozzle.

16. An apparatus for filling containers of the type having lead and trail side walls, end walls extending between the side walls, and a cover hinged to said trail side wall for closing the top of the container, said apparatus including a support frame, a nozzle mounted on the frame and having a downwardly facing opening for discharging fluent material, a container lifting member positioned below the nozzle, means for moving said lifting member from a lower position to a raised position to elevate a container into registry with the nozzle, transfer means operative when the container is filled for moving the container crosswise of the nozzle, with said trail side wall and cover for the container at the trailing side of the container, said transfer means including spaced elongated transfer members extending generally horizontally along opposite ends of the container, means supporting said transfer member for reciprocation in a direction lengthwise thereof from an initial position to an extended position and back, container engaging fingers on said transfer member engageable with a container for moving the same crosswise of the nozzle as the transfer members are extended, means for preventing distortion of said lead side wall of said container during filling, said last mentioned means including a side support member mounted for swinging movement into and out of engagement with the lead side wall of the container at the nozzle, means yieldably urging the side support member out of engagement with the lead side wall of the container at the nozzle, and means operatively connected to said transfer members for moving the said support member into engagement with the lead side wall of the container at the nozzle when the transfer members are retracted to their initial position.

17. The combination of claim 16 wherein said side support member is mounted for swinging movement about a generally horizontal axis spaced above the lower end of the nozzle.

18. An apparatus for filling containers of the type having spaced side and end walls, said apparatus including a support frame, a nozzle mounted on said frame and having a downwardly facing discharge opening, a container lifting member positioned below the nozzle, means for moving the lifting member from a lower position to a raised position to elevate a container into registry with the nozzle, transfer means operative when the container is filled for moving the container crosswise of the nozzle, means for preventing distortion of a side of the container during filling comprising a side support member mounted for movement into and out of engagement with one side wall of the container at the nozzle, and means for moving said side support member out of engagement with a side wall on the container when the lifting member is raising a container into position around the nozzle and for moving said side support member into engagement with a side wall of the container when the container is in partial telescoping relation with the nozzle.

19. A container filling machine comprising a housing having front and top walls, a nozzle having a downwardly facing discharge opening spaced above the top wall forwardly of said front wall, a container lifting member mounted for vertical movement alongside said front wall, means within said housing operatively connected to said lifting member for moving the same from a lower position to a raised position to elevate a container into registry with the nozzle, outlet transfer means for moving a filled container crosswise of the nozzle away from the filling station, said outlet transfer means including at least one rod mounted for generally horizontal sliding movement and extending through the front wall of the housing, an upwardly extending bracket on the outer end of the rod extending to a level above the top of the housing, a rearwardly extending arm on said bracket overlying the top of the housing, means mounted on said arm and engageable with a container for moving the container crosswise of the nozzle when the rod is reciprocated, and means in said housing for reciprocating said rod.

20. A container filling machine comprising a housing having front and top walls, a nozzle having a downwardly facing discharge opening spaced above the top wall forwardly of said front wall, a container lifting member mounted for vertical movement alongside said front wall, means within said housing operatively connected to said lifting member for moving the same from a lower position to a raised position to elevate a container into registry with the nozzle, container support means located at the front of said housing and engageable with a container when the latter is elevated for supporting the container when the lifting member is lowered, means extending through said front wall of said housing mounting said support means for limited vertical movement to permit the container to move downwardly as it is filled, means in said housing for substantially counterbalancing said support means and said mounting means, outlet transfer means for moving a filled container crosswise of the nozzle away from the filling station, said outlet transfer means including spaced rods mounted for generally horizontal sliding movement and extending through the front wall of the housing, upwardly extending brackets on the outer ends of the rods extending to a level above the top of the housing, rearwardly extending arms on said brackets spaced apart and overlying the top of the housing, means mounted on said arms engageable with a container for moving the container crosswise of the nozzle when the rods are reciprocated and means in said housing for reciprocating said rods.

References Cited in the file of this patent

UNITED STATES PATENTS

| | | | |
|---|---|---|---|
| 2,333,232 | Bleam et al. | Nov. 2, | 1943 |
| 2,336,415 | Nordquist et al. | Dec. 7, | 1943 |
| 2,405,232 | Nordquist | Aug. 6, | 1946 |
| 2,718,993 | McKinnon | Sept. 27, | 1955 |
| 2,927,611 | Tankersley | Mar. 8, | 1960 |
| 3,103,959 | Anderson et al. | Sept. 17, | 1963 |